United States Patent
Felde et al.

(10) Patent No.: US 6,512,963 B1
(45) Date of Patent: Jan. 28, 2003

(54) LIBRARY SYSTEM HAVING EMPTY CARTRIDGE STORAGE CELL CODED LABEL STRIPE

(75) Inventors: Steven Lloyd Felde, Tucson, AZ (US); Raymond Yardy, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 50 days.

(21) Appl. No.: 09/713,326

(22) Filed: Nov. 16, 2000

(51) Int. Cl.⁷ .................................................. G06F 7/00
(52) U.S. Cl. ........................ 700/215; 700/214; 700/259; 414/274; 369/34; 360/92
(58) Field of Search ................................. 700/213, 214, 700/218, 258, 259, 245, 253, 215, 225; 414/270, 273, 274; 901/9, 47; 369/34, 36; 360/92

(56) References Cited

U.S. PATENT DOCUMENTS

| | | | | |
|---|---|---|---|---|
| 5,034,904 A | * | 7/1991 | Moy ........................... 700/259 |
| 5,273,183 A | * | 12/1993 | Tuttobene ................... 221/121 |
| 5,323,327 A | | 6/1994 | Carmichael et al. |
| 5,426,581 A | * | 6/1995 | Kishi et al. ................. 235/383 |
| 5,450,385 A | * | 9/1995 | Ellis et al. ..................... 494/1 |
| 5,581,522 A | | 12/1996 | Sibuya et al. |
| 5,703,843 A | | 12/1997 | Katsuyama et al. |
| 5,729,464 A | * | 3/1998 | Dimitri ...................... 369/30.3 |
| 5,761,161 A | * | 6/1998 | Gallo et al. ................... 360/92 |
| 5,814,171 A | | 9/1998 | Manes et al. |
| 5,872,751 A | | 2/1999 | Utsumi et al. |
| 5,898,593 A | * | 4/1999 | Baca et al. .................... 360/92 |
| 5,993,045 A | * | 11/1999 | Schmidtke et al. ........... 360/92 |
| 6,005,734 A | * | 12/1999 | Shimada et al. .............. 360/69 |
| 6,008,964 A | * | 12/1999 | Goodknight et al. ......... 360/69 |
| 6,192,294 B1 | * | 2/2001 | Chiba ......................... 700/214 |
| 6,213,705 B1 | * | 4/2001 | Wilson ....................... 414/274 |
| 6,246,242 B1 | * | 6/2001 | Sakai ......................... 324/549 |
| 6,330,489 B1 | * | 12/2001 | Iwakawa |

FOREIGN PATENT DOCUMENTS

| | | |
|---|---|---|
| JP | 07250362 | 9/1995 |
| JP | 07067114 | 2/1996 |
| JP | 09304932 | 10/1997 |

* cited by examiner

*Primary Examiner*—Khoi H. Tran
(74) *Attorney, Agent, or Firm*—James A. Pershon

(57) ABSTRACT

In a mass storage library, a module storage array includes a back plate having apertures patterned to form a cartridge storage together with cell blocks that mate with the openings in the back plate. A column of cell blocks are held in place between a shelf and a spring load and include calibration targets to align the cell blocks to the library accessor and reader. One stripe the length of the storage cell stack contains a bar-code. The bar-code extends the entire length of the stripe and identifies the individual cell blocks when empty. A plurality of columns of cell blocks provide the complete storage array. Each column of the cell blocks include one stripe with a bar-code along its length that is directly fastened to the back plate with each cell of the column having a separate bar-coding on the strip. The accessor includes a sensor that reads the coding to provide an indication of an empty cell block.

8 Claims, 13 Drawing Sheets

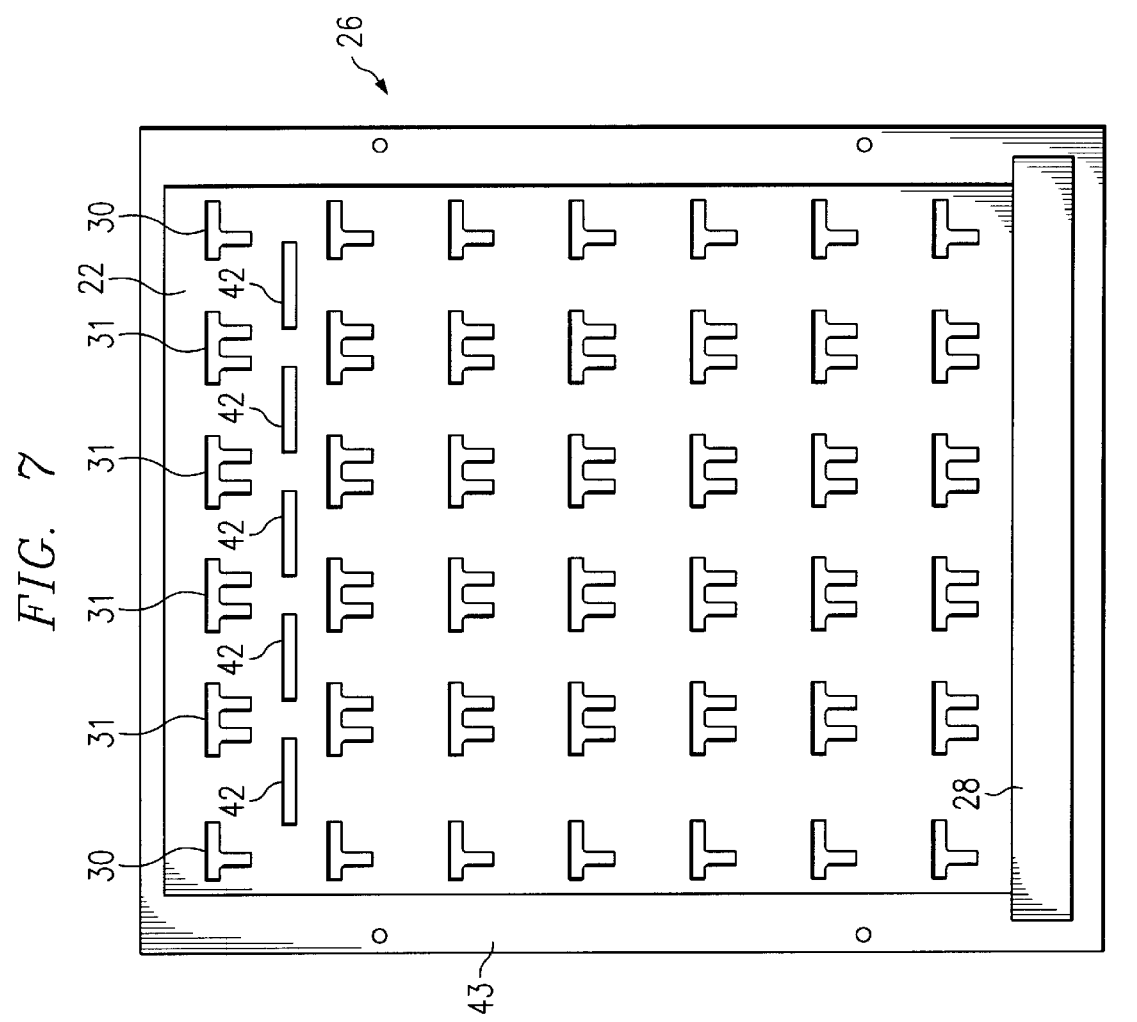
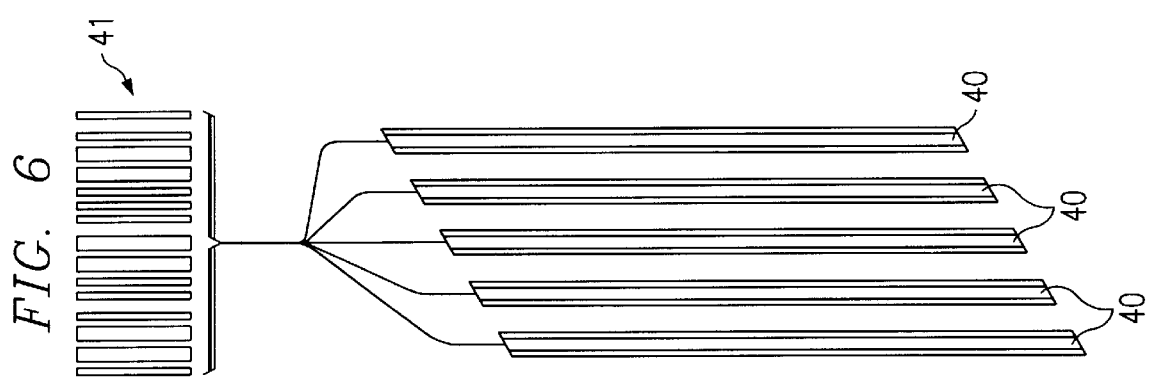

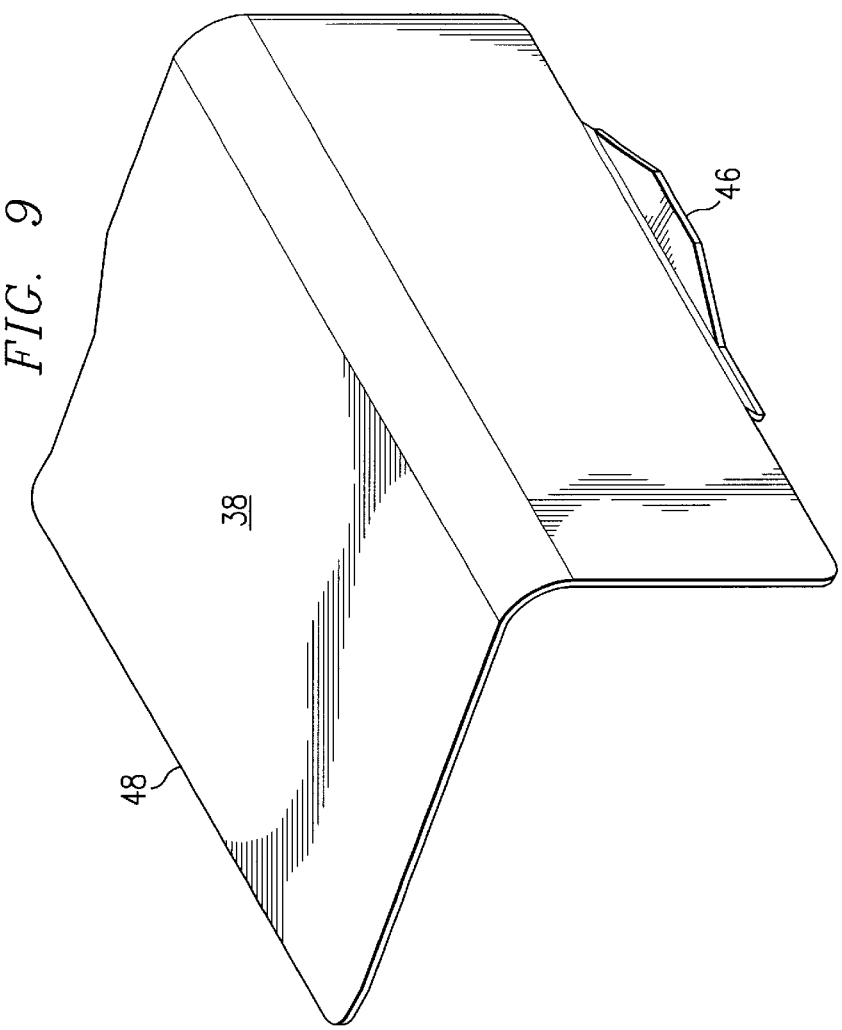
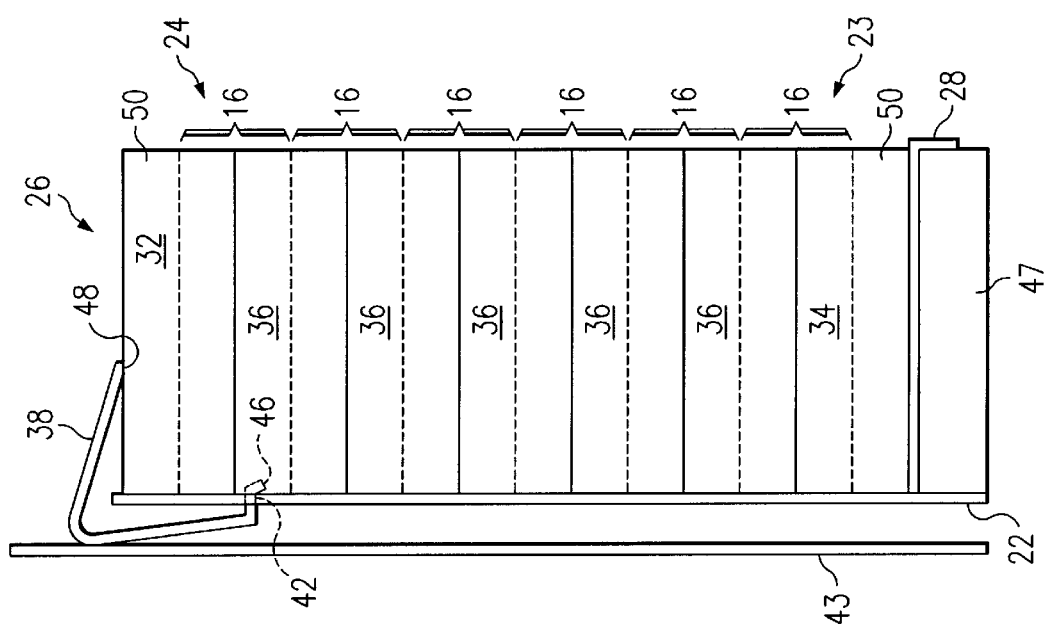

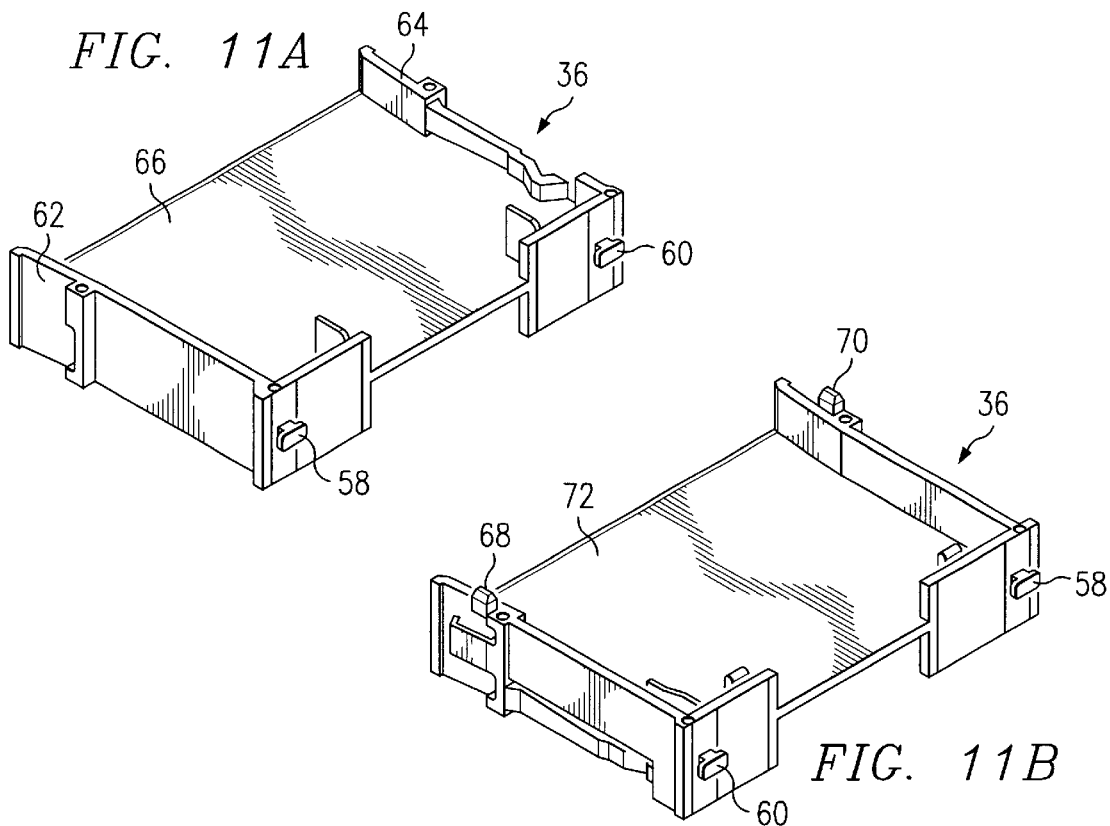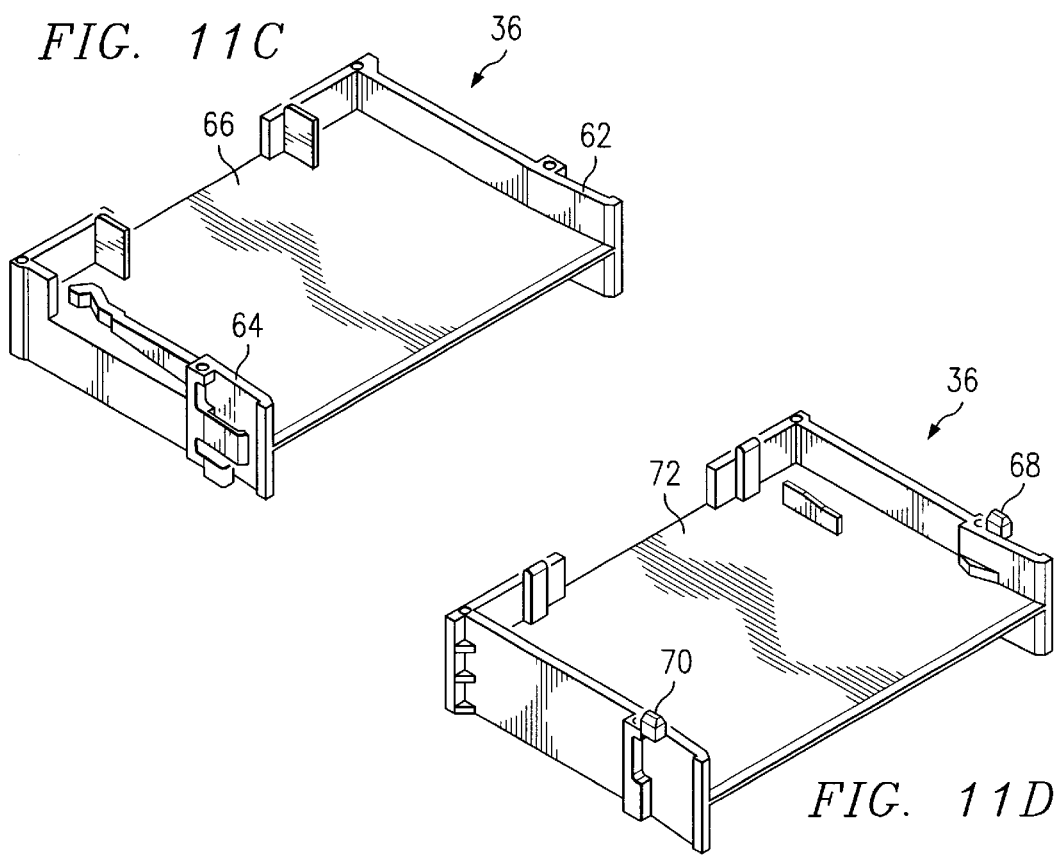

WHEREAS
X=X AXIS LOCATION
Y=Y AXIS LOCATION
T=TOP FIDUCIAL
B=BOTTOM FIDUCIAL
NN=COLUMN NUMBER

LIBRARY SYSTEM HAVING EMPTY CARTRIDGE STORAGE CELL CODED LABEL STRIPE

RELATED APPLICATIONS

This application is being filed on the same date together with patent application Ser. No. 09/713,336 TUC9-2000-0022, entitled "STORAGE CELL MOUNTING AND ALIGNMENT FOR CARTRIDGE SYSTEM LIBRARIES" and patent application Ser. No. 09/713,327 TUC9-2000-0043, entitled "LIBRARY SYSTEM HAVING CALIBRATION TARGETS FOR PRECISELY LOCATING ALIGNMENT OF COLUMNS OF CARTRIDGE STORAGE CELL ARRAYS RELATIVE TO THE CARTRIDGE ASSESSOR UNIT", all assigned to the same assignee.

FIELD OF THE INVENTION

This invention relates generally to an information storage library and more specifically to the coding of empty storage cell using a coded label stripe fastened to the panel mount of the storage cells in the library.

BACKGROUND OF THE INVENTION

Information storage libraries include cartridges that are selected and loaded to a drive unit for data recording and reproduction. The tape library apparatus comprises a storage cell unit having a plurality of cells each accommodating a cartridge, a magnetic drive unit for recording and reproducing data, and an accessor for automatically switching cartridges between the cell unit and the drive unit. The library apparatus further comprises an input/output unit for entering cartridges into the library apparatus. The accessor transports cartridges through the drive unit, storage cell unit, and the input/output unit. Library apparatus of this kind are widely used as an external mass storage devices for computers.

In previous library storage systems, a bar-code reader or scanner is used to inventory the data storage media within the storage array of the library. This inventory method can also identify and locate empty storage cells within the storage array. All the storage cells are provided with a bar-code label that the accessor recognizes as denoted an empty cell. When there is a cartridge in any particular cell, and that cell is scanned by the bar-code reader, the reader either reads the cartridges' bar-code label, if it is supplied with one, or it reads no label. If the storage cell is empty, the reader reads an "empty cell" label, and it recognizes the cell as empty. In the previous library systems, each storage cell had its own "empty cell" bar-code label attached to the cell at some point during the manufacture of the library system. With ever increasing storage capacities, this could mean there are several thousand storage cells in the storage array, each with its own bar-code label. What is needed is the elimination of the need for individual bar-code labels on every storage cell in the storage array.

It is, therefore, an object of the present invention to provide an enhanced storage cell mounting system for information storage libraries.

Another object of the present invention, therefore, is to provide a mounting for storage cells that is easy to assemble while providing a means for the library system to recognize an empty cell.

There is an ongoing need for an easy method of providing a coding label that provides each storage cell with its own empty cell label while providing an ease of manufacturing and assembling the storage array of cartridges that can provide the location of every empty cell in the array to the robotic picker.

SUMMARY OF THE INVENTION

These and other objects of the present invention are achieved by providing an automated storage library having a media storage cell array system for a plurality of data cartridges, at least one drive mechanism, a transport mechanism or accessor for moving the cartridges between the drives and the storage cell area, the transport mechanism or accessor includes a robotic picker, wherein a coding label stripe is applied to the back plane of the storage array. This label stripe is applied to the back plane vertically, allowing the full height of the storage array, using one stripe containing a continuous code striping on each label stripe for each column of storage cells in the array. Each storage cell has an opening at its back end that allows the reader to read the coded labels stripe whenever there is no cartridge media in that particular storage cell. The coding of each individual cell position on the stripe is either a bar-code striping or other coding information readable and translated to identify a special storage cell and is readable by a scanner for transmitting the information to the library system.

In accordance with another aspect of the present invention, there is provided a library system comprising: a plurality of cartridges for storing data information located on media within each of the plurality of cartridges, a plurality of data recorder modules for receiving and reading information from and writing information to a selected cartridge for information storage, at least one storage cell module array having a plurality of storage cell cavities for retaining the cartridges, a data directory for maintaining a directory of the information stored in the mass storage library, an accessor including a picker mechanism and associated with the storage module for retrieving cartridges from its storage cell cavity and for transporting cartridges between its storage cell and one of the plurality of data recorders and for returning the cartridges to its storage cell cavity after the operation and a gripper means mounted on the picker mechanism accessor for grasping the cartridge, the improvement wherein each storage cell module array includes a back plate mounting means having a plurality of stripes, one for each column of storage cells with the stripes including a code marking means along the entire length of each stripe. The code marks on the stripes are read by the accessor and denote the identification of an empty storage cell when no cartridge is in the cell.

BRIEF DESCRIPTION OF THE DRAWINGS

FIG. 6 is a perspective view of the label stripes of FIG. 4 with bar-code markings;

FIG. 7 is a frontal view of the mounting plate including "T" shaped apertures for the storage cells;

FIG. 8 is a side view of the storage cell mount with the cell blocks;

FIG. 9 is a perspective view of the resilient spring means used to hold down the stack of storage cells as shown in FIG. 8;

FIGS. 11A to 11D are perspective views of the middle storage cells which are positioned between the top and bottom storage cells of FIGS. 10A to 10D as shown in FIG. 8;

DETAILED DESCRIPTION OF THE INVENTION

Referring to the illustrations, like numerals correspond to like parts depicted in the figure. The invention will be described as embodied in an automated magnetic tape library storage subsystem for use in a data processing environment. Although the invention shown uses magnetic tape cartridges, one skilled in the art will recognize that the invention equally applies to optical disk cartridges or other removable storage media. Furthermore, the description of an automated magnetic tape storage system is not meant to limit the invention to data processing applications as the invention herein can be applied to storage and cassette handling systems in general.

Figure 1:
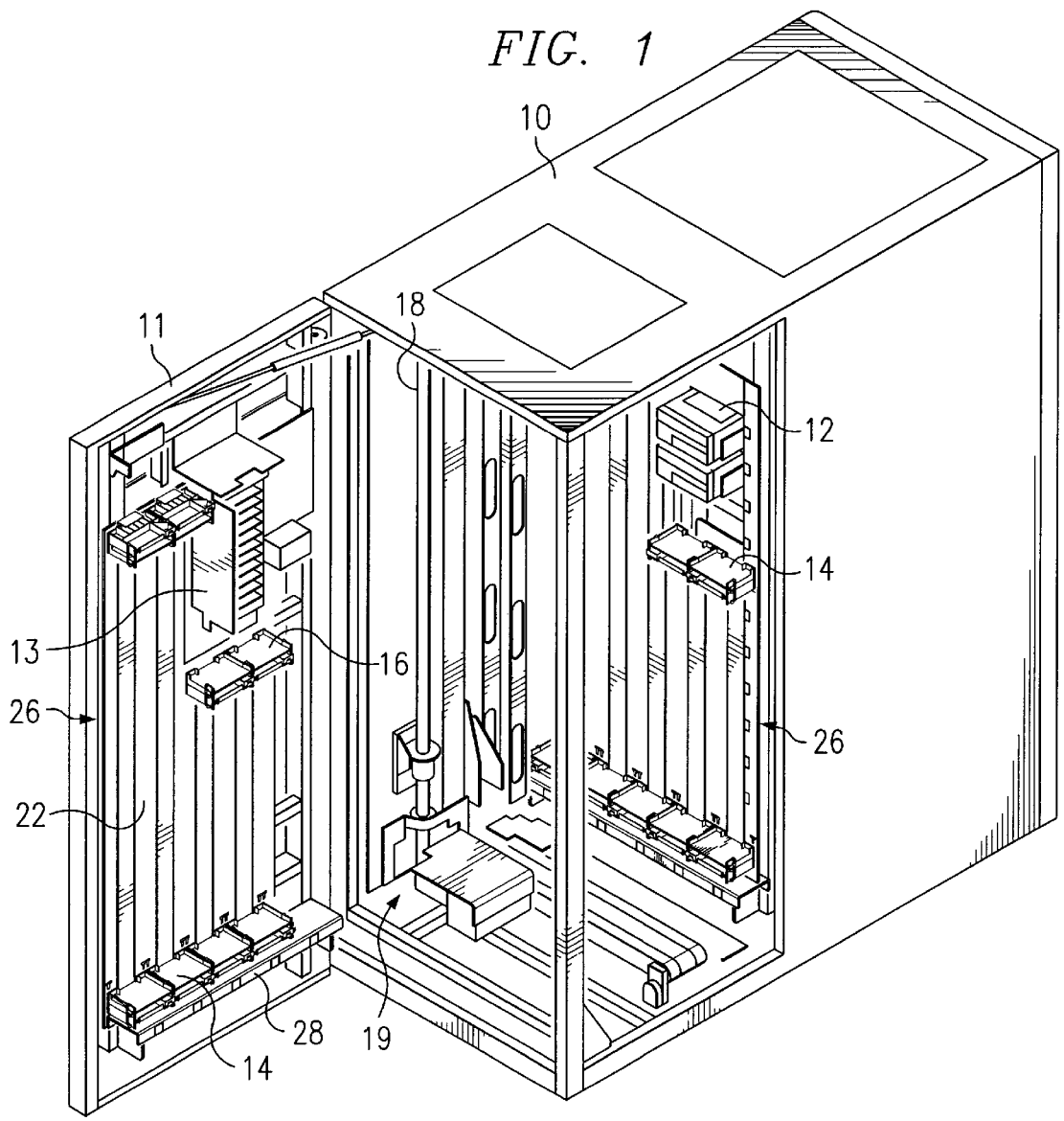
FIG. 1 is a perspective view of an automated storage and retrieval data processing library employing the storage cell mounting means of the present invention.
Figure 1A:
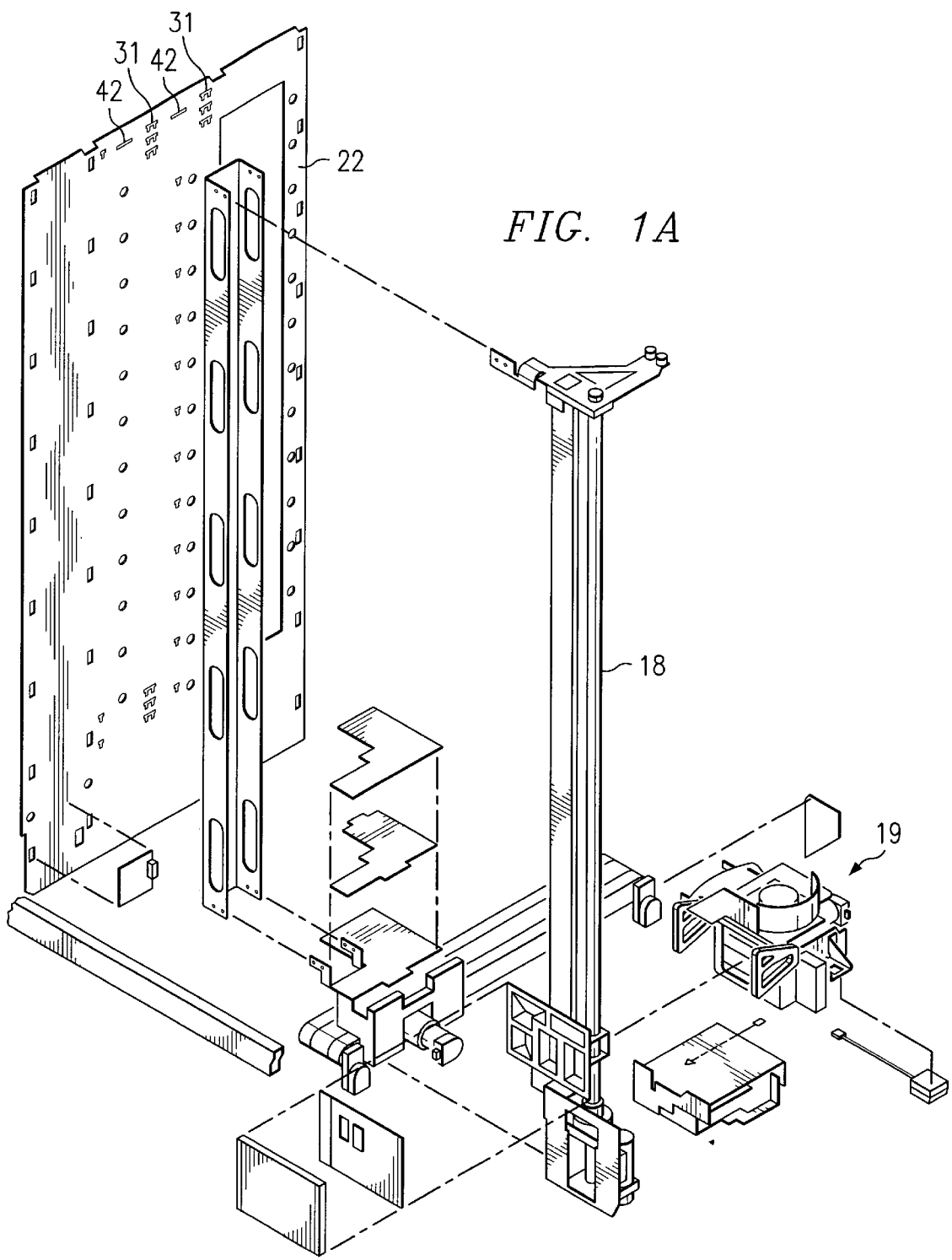
FIG. 1A is an exploded view of the accessor 18 of FIG. 1.

FIG. 1 is a perspective view of one type of an automated information storage and retrieval library 10 employing an input/output station 13 mounted on a door 11. The library 10 includes one or more data recorder modules or drives 12, a plurality of cartridges 14 stored in a bank of cavities comprising storage cells 16 and forming a storage module, an accessor 18 for transporting a selected cartridge between a storage cell and a drive 12, see FIG. 1A. The accessor 18 includes a cartridge picker 19. The accessor 18 can access cartridge either from the storage cells 16 or from the input/output station 13. Only a few cartridges 14 and storage cells 16 are shown. It should be noted that the entire open section of the library 10 in operation is generally completely lined with storage cells 16 each containing one cartridge 14 and comprising several storage cell mounting arrays 26. Each storage cell 16 is fastened to the back plate 22. Columns of storage cells 16 rest on a shelf 28 as will be described further.

The drives 12 can be optical disk drives or magnetic tape drives and the cartridge can contain optical or magnetic media, respectively. The storage cells 16 are supported by the mounted plate 22 to hold the cartridges 14 in correct alignment with the cartridge picker 19 of the accessor 18 (see FIG. 1A) and also in alignment with the drives 12. The library 10 also includes a library data director or controller that connects with, and controls the actions of the drives 12 and the accessor 18.

Figure 1B:
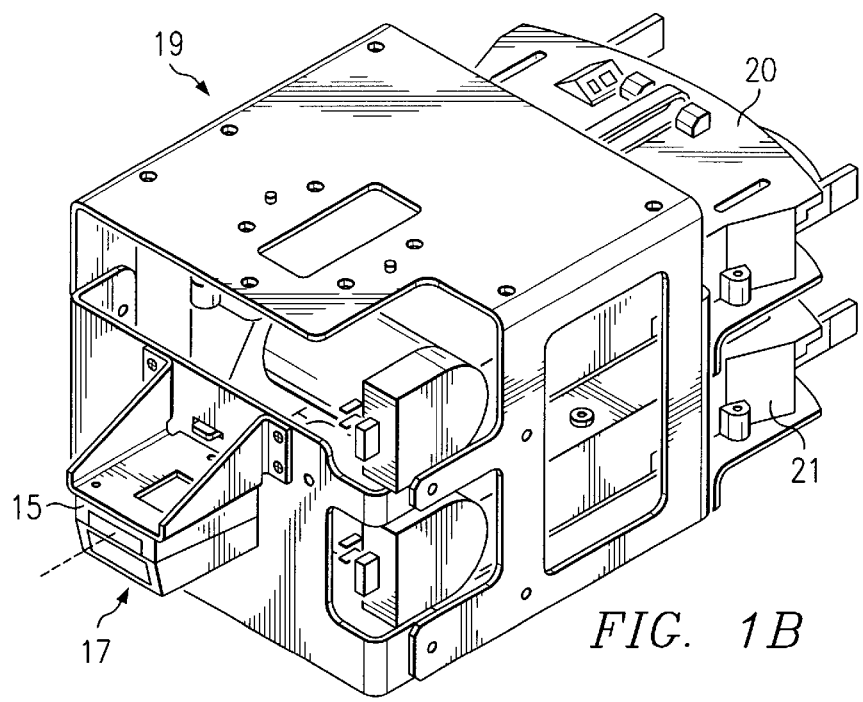
FIG. 1B is a perspective view of the picker 19 of FIG. 1A.

FIG. 1B shows the picker mechanism 19 with two gripper mechanisms 20 and 21. A bar-code scanner 17 is shown mounted to the picker 19. The scanner 17 is used to scan the bar-code identifying marks for an empty cartridge storage cell 16 as shown in FIGS. 4–6 and discussed later.

Figure 2:
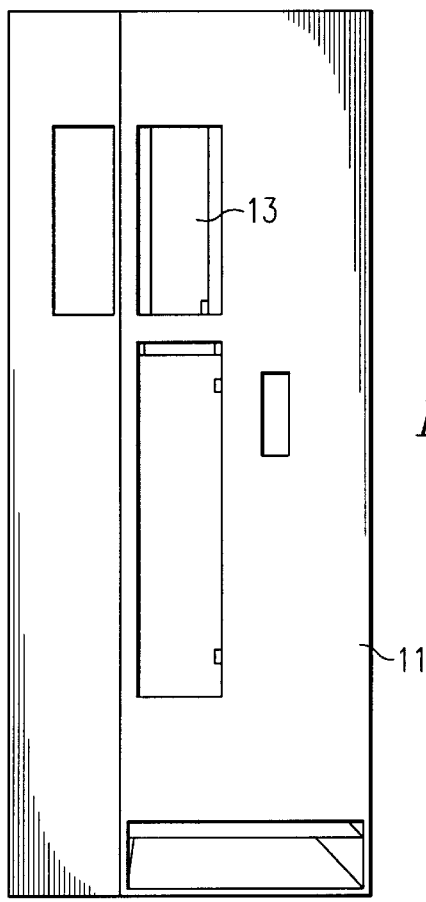
FIG. 2 is a frontal view of the library system of FIG. 1.

FIG. 2 shows a frontal view of the library system 10 with the input/output station 13 positioned for easy access by an operator to input cartridges required by the library system and to remove cartridges after the reading and/or writing of the media in the cartridges is completed. The input/output station 13 is shown positioned next to the mounting plate 22, see FIG. 1, which, together with the storage cells 16, form one of a plurality of storage cell mounting arrays 26.

The controller, which includes at least one computing processor, is further interconnected with a host processor from which it receives access commands. Information to be recorded on, or to be read from, selected cartridges 14 is transmitted between the drives 12 and the host through the library controller or directly between the drives 12 and the host. The storage cell mounting array 26 of the present invention includes the mounting plate 22 and the storage cells 16 and is shown in FIGS. 3, 4 and 5.

Figure 3:
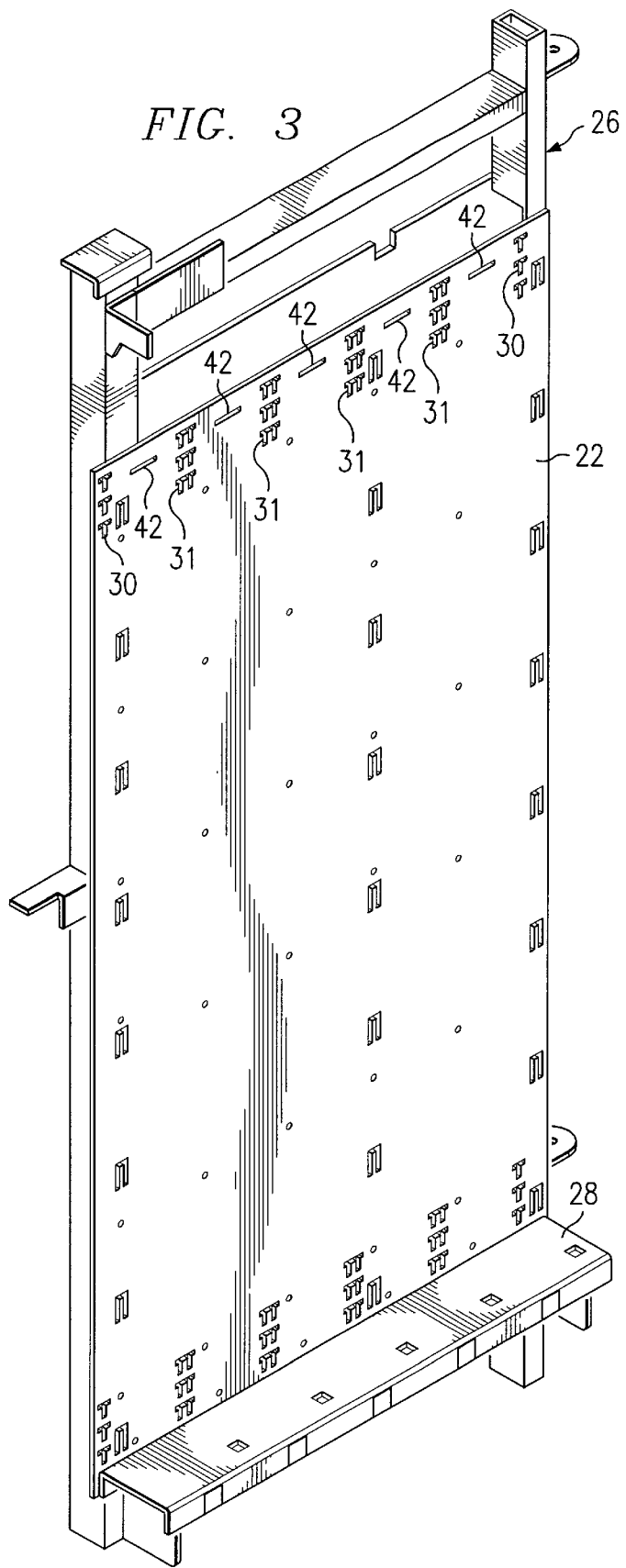
FIG. 3 is a perspective illustration of a storage cell mount according to the present invention.
Figure 4:
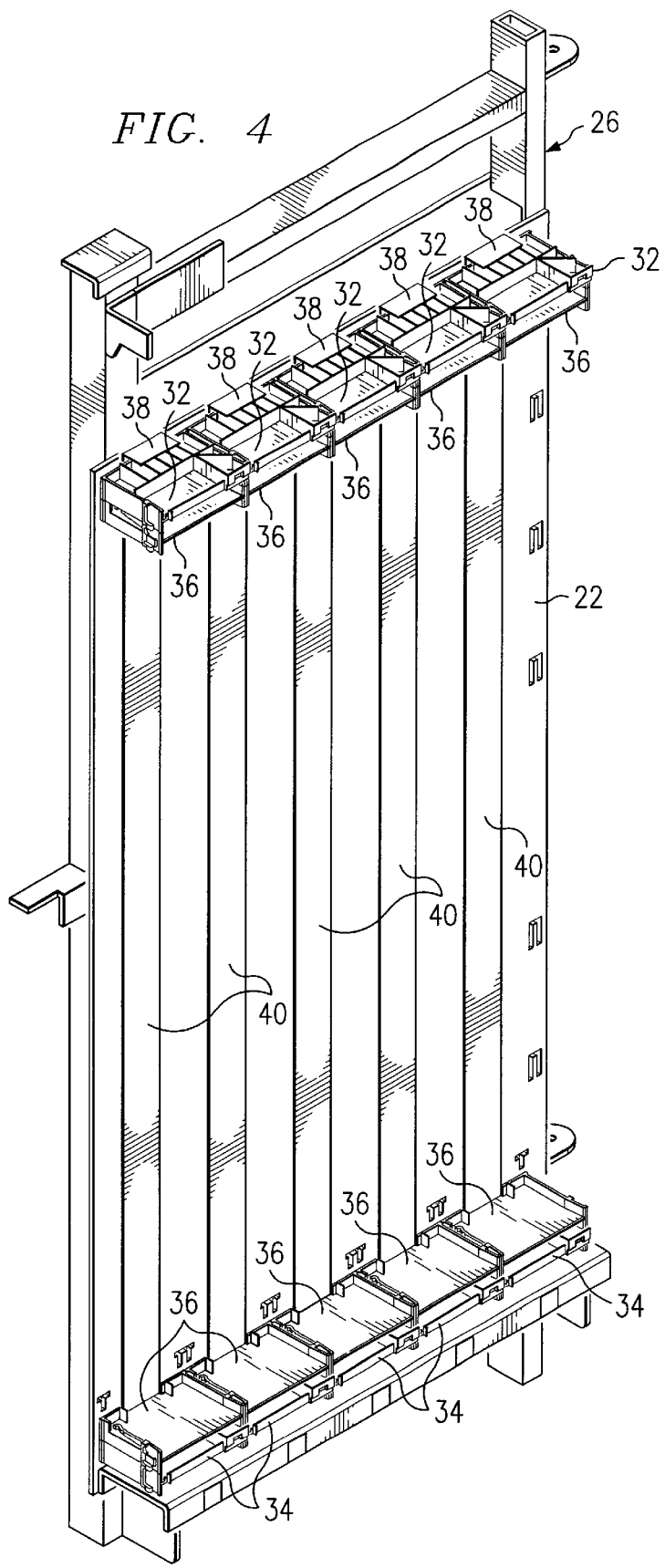
FIG. 4 is a perspective view of the mount of FIG. 3 including several storage cells and bar-code label stripes.
Figure 5:
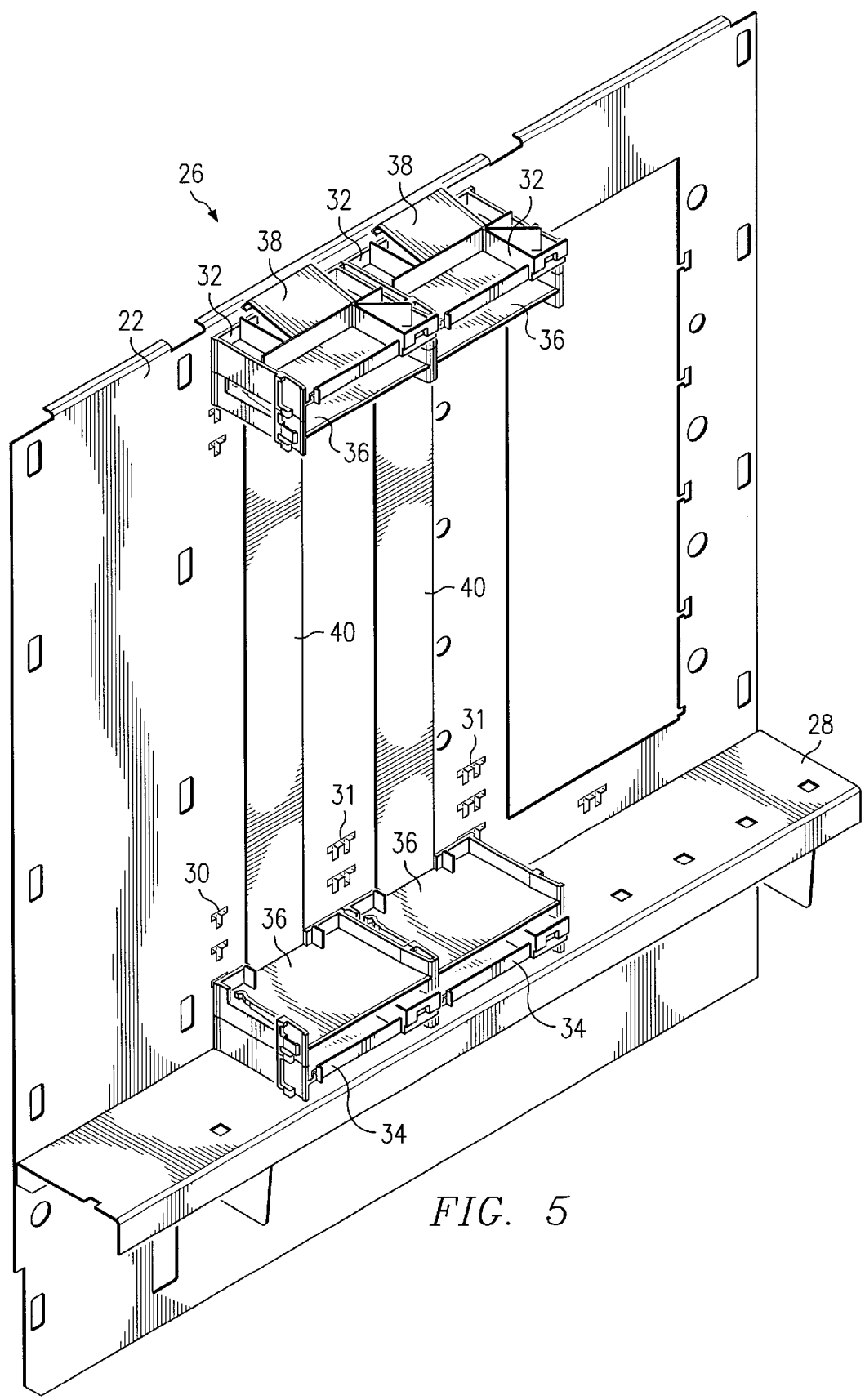
FIG. 5 is a perspective view of a close-up of FIG. 4.

Referring now to FIGS. 3, 4 and 5, the storage cell mounting array 26 is shown as including the back or mounting plate 22 with some of the storage cell blocks mounted to the back plate 22. The back plate 22 includes the shelf 28 supporting the bottom array of storage cell blocks. A plurality of essentially "T" shaped openings 30 and 31 are formed in the back plate 22 to support the storage cell blocks. The storage cell blocks include a top cell block 32 and a bottom cell block 34. The top and bottom cell blocks 32 and 34 are the same and will be discussed later with respect to FIGS. 10A to 10D. The storage cell blocks also include a series of intermediate cell blocks 36 which comprise the remaining storage cell blocks mounted between the top cell block 32 and the bottom cell block 34. The intermediate cell blocks 36 are further discussed later for FIGS. 11A to 11D. Resilient means shown as springs 38 press against the top cell blocks 32 and hold all of the storage cell blocks against the shelf 28. Continuous bar-code label stripes 40 are provided as shown in FIGS. 4 and 6, one stripe 40 for each column of storage cell blocks 32, 34 and 36. Each continuous stripe 40 includes a plurality of bar-code or similar identifying markings 41 (see FIG. 8).

In FIG. 6, five label stripes 40 are shown. The five stripes 40 would cover five columns of cell blocks (see FIG. 4) for one storage cell mounting array 26. Each continuous stripe 40 includes a code marking 41 extending the entire length of each stripe 40. The code marking 41 is viewable through each of the cell blocks in each column. The single stripe 40 and the single code marking 41 on each stripe 40 replaces the separate pieces for each cell block as required in the prior art. In the preferred embodiment, the code marking 41 is a bar-code arrangement as shown in FIG. 6. A front view of the back panel 22 of the storage cell mounting array 26 without the storage cell blocks is shown in FIG. 7.

Referring now to FIG. 7, the storage cell mounting array 26 shows the back plate 22 and the positioning of the shelf 28 with respect to the "T" shaped openings 30 and 31. Slots 42 are provided in the back plate mounting means 22. The slots 42 support one end of the springs 38 (see FIG. 4), with the other end of the springs 38 pressing against the top cell block 32. Further discussion of this placement of the spring 38 in relation to the back plate 22 will be given later when the framework 43 is discussed in relation to FIG. 8.

The back plate 22 of the storage cell mounting array 26 is a single sheet of metal larger than the storage cell array 26. Into this back plate 22 is punched a series of single "T"

shaped aperture or holes 30 and double "TT" shaped holes 31. The single "T" shaped holes 30 are spaced along the outer vertical edges of the back plate 22 and hold the outside column of the storage cells structure. The double "TT" shaped holes 31 form the inside columns of the storage cells with each "T" of the double "TT" shaped holes 31 supporting one edge of the storage cell structure. Thus, each double "TT" shaped holes support one edge of two storage cells structures. Further discussion of the holes 30 and 31 will be given later when the building of the back plate 22 to support the storage cell mounting array 26 is given.

The back plate 22 also supports the shelf 28 which in turn will support the storage cell blocks when the storage array 26 is mounted vertically into the library storage frame. The back plate 22 can be firmly mounted onto the library storage frame by welding, for instance, to the framework 43. The punching of all of the openings in the back plate 22 such as the "T" shaped openings 30 and 31 and the slots 42 and the mounting of the shelf 28 can be done very accurately on a numerically controlled punch system, for instance, at the time of manufacture. Each of the storage cell blocks to be mounted onto the back plane 22 has two "T" shaped protrusions on the back of each storage cell block that clip into the back plate "T" shaped openings 30 and 31. This provides the lateral location for the storage cells. The storage cell blocks sit and interlock one upon the other and are supported by the shelf 28 as shown in FIG. 8.

Figure 10A:
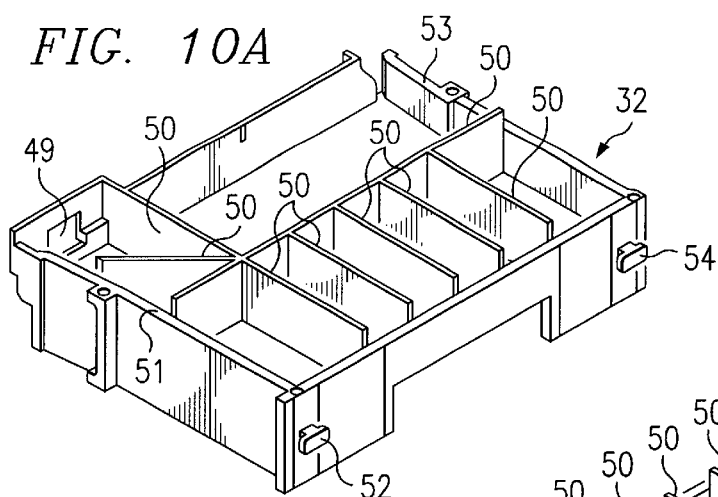
FIGS. 10A to 10D are perspective views of the top and bottom storage cell as shown in FIG. 5.
Figure 10B:
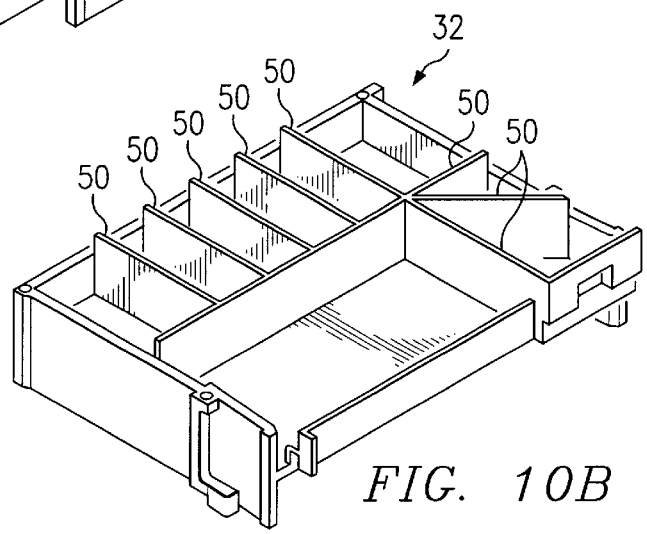
Figure 10C:
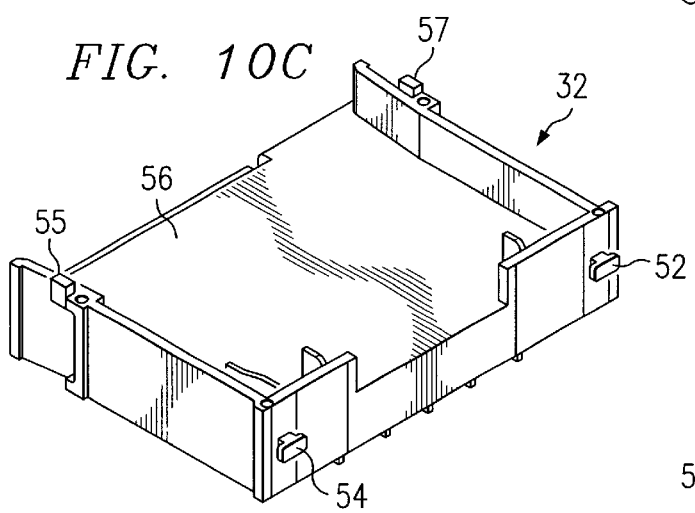
Figure 10D:
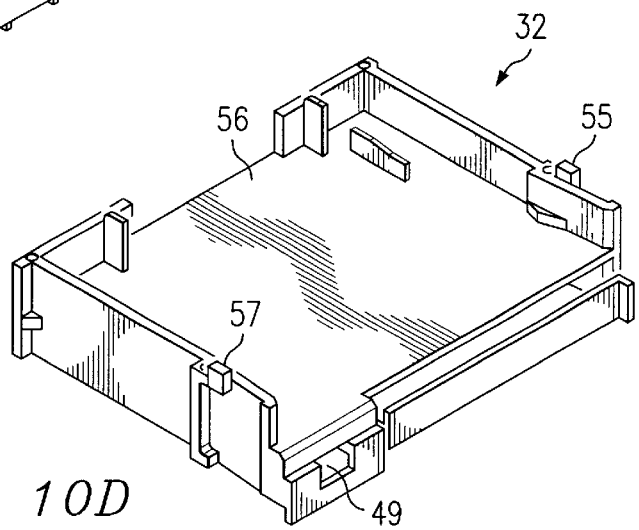

Referring now to FIG. 8, the storage cell mounting array 26 includes the top cell block 32, the bottom cell block 34, and a plurality of intermediate cell blocks 36 supported between the top cell block 32 and the bottom cell block 34. The bottom cell block 34 in turn is supported by the shelf 28. The shelf 28 is held in position by a shelf support 47 which is firmly fastened to the back plate mounting means 22. The spring 38 is shown pressing against the top cell block 32 while having its lower end protruding through one of the notches shown as slots 42. A detail of the shape of spring 38 is shown in FIG. 9. The framework 43 presses against the spring 38 to provide spring resilient force at the top end 48 against the top cell block 32 thereby holding all of the storage cell blocks 32, 34 and 36 against the shelf 28. The interplay between each of the cell blocks into their supporting blocks and the formation of the storage cells 16 by the cell blocks will be further discussed with the structure of the cell blocks as shown in FIGS. 10A to 10D and FIGS. 11A to 11D. The configuration of the top cell block 32 and the bottom cell block 34 of the storage cell mounting array 26 is shown in FIGS. 10A to 10D. The storage cell block shown in FIGS. 10A to 10D is useful for either the top cell block 32 or the bottom cell block 34 as shown in FIG. 8. FIGS. 10A and 10C show the back perspective view of the top cell block 32 showing the connection to the back plate 22 while FIGS. 10B and 10D show the frontal view of the top cell block 32 as viewed from the accessor 18 or robotics side of the library 10.

FIGS. 10A and 10B show the topside of the top cell block 32 and FIGS. 10C and 10D show the underside of the same cell block. For purposes of this discussion, it will be assumed that the top cell block 32 is being described but it should be understood that the cell block of FIGS. 10A and 10B could equally be the bottom cell block 34. In FIGS. 10A and 10B, the top of cell block 32 has a series of panels 50 which mainly are support structures to provide a structure to allow the spring 38 to apply a force which holds the cell stack against the shelf 28. The storage cell blocks of this construction are of the size and shape to support the tape cartridge. The top cell block 32 includes two "T" shaped protrusions 52 and 54 which are shaped to mate with the "T" shaped openings 30 and 31 of the back panel 22 as shown in FIG. 7. FIGS. 10C and 10D show the underside of the top cell 32. The underside of the top cell block 32 includes an open area 56 that forms a cavity which provides one-half of the sleeve-like construction of the total storage cell that eventually will hold the cartridges 14. There is essentially no difference between the top cell block 32 and the bottom cell block 34, the only difference being is that there is one cell block mounted at the top of the storage cell array 26 (see FIG. 8) against which the spring 38 presses against while the bottom cell block 34 rests on the shelf 28. Supported between the top cell block 32 and bottom cell block 34 are the intermediate cell blocks 36 as shown in FIG. 8. The top and bottom cell blocks 32 and 34 also include a calibration target 49 which will be discussed later. The structure of the intermediate cell blocks 36 are shown in FIGS. 11A to 11D.

FIG. 11A shows the topside of the intermediate storage block 36 while FIG. 11B shows the bottom side of the same intermediate cell block 36, both views from the back side. The intermediate cell blocks 36 likewise include the "T" shaped portions 58 and 60 which are of the same construction to the "T" shaped 52 and 54 of the top cell block 32. The bottom side of the top cell block 32 of FIGS. 10C and 10D includes projections 55 and 57. The top side of the intermediate cell block 36, as shown in FIG. 11A, includes mating locations 62 and 64 which mate with the projections 57 and 55 of the top cell block 32 (as shown in FIG. 10C) as well as the projections 68 and 70 of an adjacent intermediate cell block 36. The intermediate cell block 36 also includes an opening 66 which together with the opening 56 of the top cell block 32 form one storage cell 16. As shown in FIG. 11B, the intermediate cell block 36 also includes projections 68 and 70 and an opening 72. All of the projections on the cell blocks 32, 34, and 36 such as projections 55, 57, 68 and 70 interlock with mating structures of the intermediate blocks 36, such as the mating structures 62 and 64 shown in FIG. 11A. FIGS. 11C and 11D show the underside views of FIGS. 11A and 11B, respectively.

Referring again to FIG. 8 for the building of the storage cell mounting array 26, together with FIGS. 10A to 10D and 11A to 11D, the bottom cell block 34 is placed on the shelf 28 with its support structure panels 50 facing upward with its protrusions 52 and 54 placed into the bottom adjacent "T" shaped openings 30 and 31. The projections 68 and 70 of the first intermediate cell block 36 lock with the mating structure 53 and 51, respectively, of the bottom cell block 34. The second intermediate cell block 36 is placed on the first intermediate cell block with its protrusions also placed into the next higher "T" shaped openings 30 and 31 of the back plate 22 and its projections 68 and 70 mating with the mating structures 64 and 62, respectively, of the first intermediate cell block. The opening 66 of the first intermediate cell block and the opening 72 of the second cell block form a cavity 23 as shown in FIG. 8, which becomes one storage cell 16 of the library 10 of FIG. 1. At the top of the stack, as shown in FIG. 8, the top storage cell 32 is placed on the last intermediate storage cell of the stack again with the projections 55 and 57 (FIG. 10C) mating with the mating surfaces 62 and 64 (FIG. 11A) and its protrusions into the appropriate "T" shaped openings of the back plate 22 thereby forming a cavity 24 which becomes the top storage cell 16 of FIG. 4. The protrusions 52, 54, 58 and 60 of the storage cells lock into the "T" shaped openings 30 and 31 of the back plate 22 to hold the storage cells against the back plate 22 while permitting vertical movement of the stack of storage cells with the clamp spring 38 firmly holding the entire stack in contact with the shelf 28, see FIG. 8.

FIG. 9 shows the shape of the spring 38 together with its lower end 46 and the top end 48. The spring clamp 38 can be made of any resilient material such as spring steel to form the holding structure as shown in FIG. 8.

Referring now to FIG. 3 for an explanation of the construction of the storage cell mounting array 26 according to the present invention. After the back panel mounting means 22 is punched to contain all of the "T" shaped openings 30 and 31 and the slots 42, see FIG. 7, together with the mounting openings for the shelf 28, the shelf 28 and the shelf support 47 (see FIG. 8) are mounted to the back plate 22. Then the bottom cells 34 are placed onto the shelf 28. The protrusions such as protrusions 52 and 54 of FIG. 10A are locked into the "T" shaped openings 30 and 31. After a row of the bottom cell blocks 34 are placed onto the shelf 28, the first column of intermediate cell blocks 36 are placed on top of the bottom cell block 34. The protrusions 68 and 72 of the intermediate cell block 36 of FIG. 11A then is contacted with the mating structures 51 and 53 of the bottom cell block such as shown in FIG. 10B. The "T" shaped protrusions 58 and 60 of the intermediate cell block 36 mate with the "T" shaped openings 30 and 31. These intermediate cell blocks are then placed one on top of the other until the entire height of the storage cell array is completed. A top cell 32 is placed at the top end such that protrusions 55 and 57 likewise mate with the mating structures 62 and 64 of the intermediate cell 36 which is just underneath the top cell block 32. The spring 38 then has its lower end 46 inserted into the notch 42, see FIG. 7, while the top end of the spring 38 is directed against the top cell block 32 as shown in FIG. 8. Each column of cell blocks from the bottom cell 34 through the intermediate cell blocks 36 to the top cell block 32 form one column of the entire storage cell array. The openings in each of the storage blocks provide one half of the eventual storage cell openings 16 to contain one cartridge 52. The horizontal portion of the "T" shaped openings 30 and 31 provide an easy slot for entering the cell blocks 32, 34 and 36 into the back panel 22 while the vertical portion of the "T" shaped openings 30 and 31 provide a restriction against any horizontal movement of the individual cell blocks. Thus, all of the cell blocks are inserted into the "T" shaped openings 30 and 31 via their "T" shaped protrusions. The bottom cell 34 rests against the shelf 28. The top cell 32 and the intermediate cells 36 are firmly held into position with their "T" slots and "T" shaped protrusions interlocking and all are held firmly down against the shelf 28 by virtue of the springs 38. Each column of cell blocks interlock and are therefore held in perfect alignment in both the vertical and horizontal position thereby providing accurate one time alignment of the storage array. The back plate 22 can be firmly mounted within the library system 10 by welding for instance to retain the accurate cell location for the life of the system.

The height of the storage cell array 26 will vary with not only the manufacturing tolerances of the individual cell blocks 32, 34 and 36 but also with temperature and humidity. This is accommodated by the top of the storage cell array being held down by the spring 38. In this manner the storage cell array can grow and shrink and the individual cell blocks can still be held in close proximity one to the other. The robotic gripper 19 can be programmed to calibrate the location of both the bottom and the top of the storage cell array as will be discussed later. Thus the robotic gripper 19 can compute the exact location of every storage cell 16 despite the manufacturing tolerances and the temperature and humidity variations.

Figures 12, 13, 14:
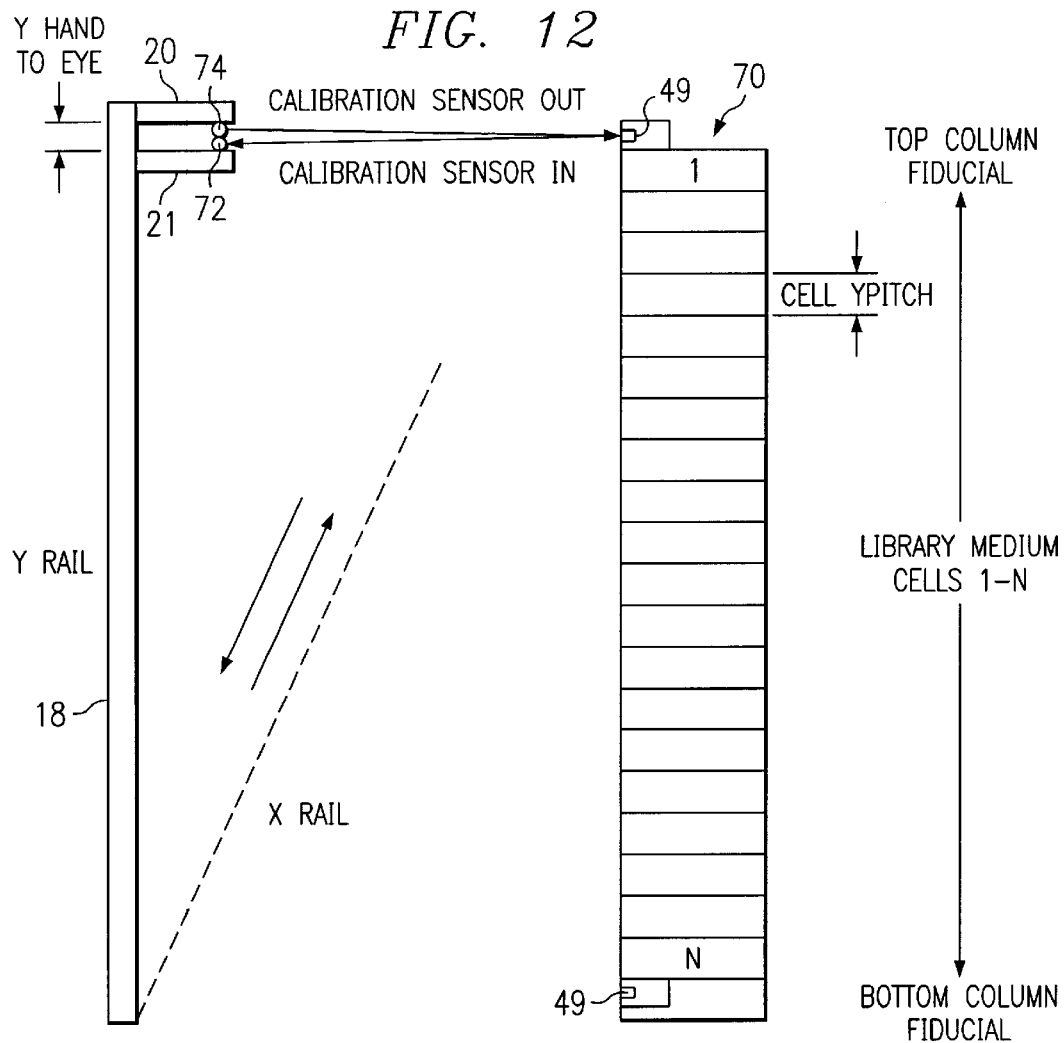
FIG. 12 shows a pictorial representation of the scan mechanism for the storage cell array.
FIG. 13 is a frontal view of a column of storage cells with the alignment fiducials.
FIG. 14 shows the center calculation alignment fiducial.
Figure 15:
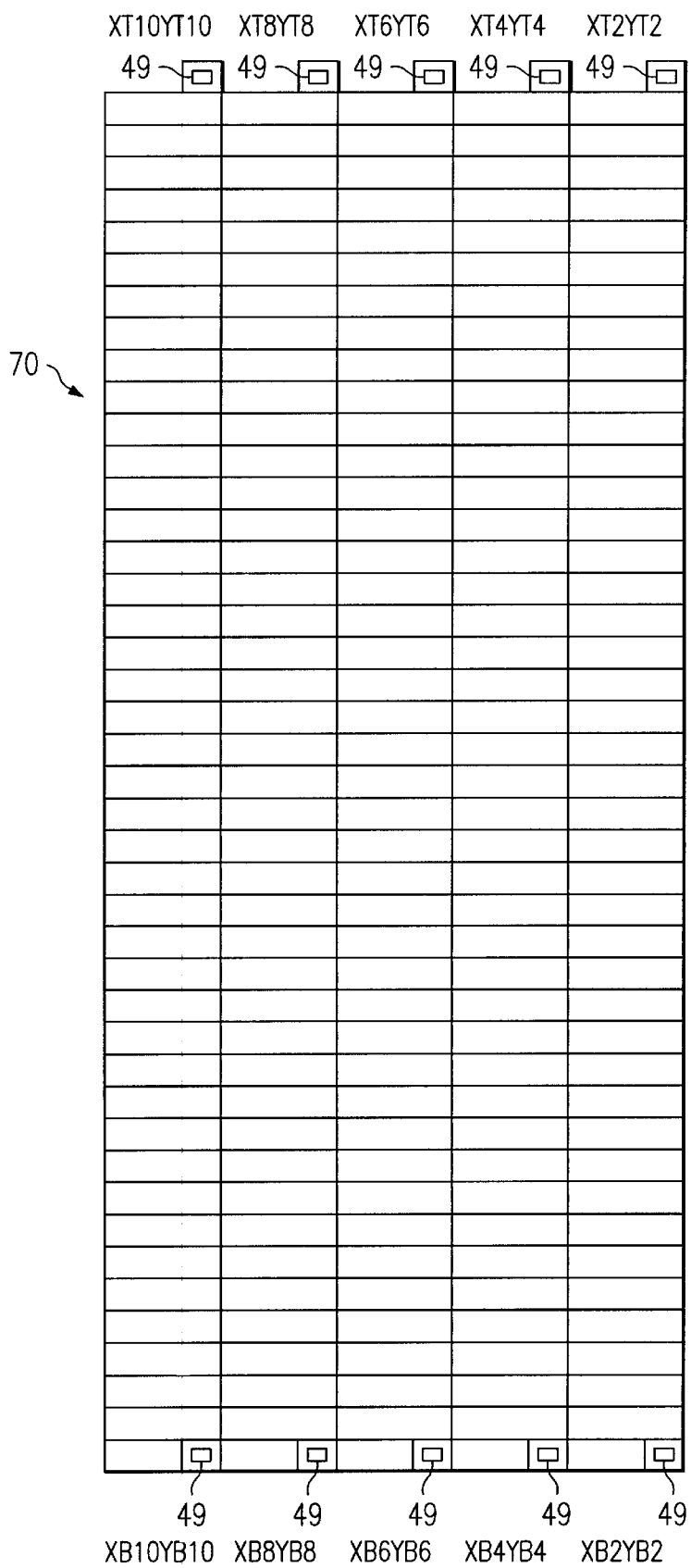
FIG. 15 is a frontal view of a storage cell array with the positioning of the top and bottom fiducials for each column as shown in FIG. 13.

The calibration mechanism for the storage cell alignment is shown in FIGS. 12, 13, 14, 15, and 16. As shown in FIG. 12, the calibration mechanism includes the light emitting structure 74 and the optical sensor 72. Both are mounted between the two gripper mechanisms 20 and 21 of the accessor 18 (see also FIGS. 1A and 1B). The light emitter 74 emits a beam of light towards the calibration target 49 of the cell stack 70. The fiducial or calibration target 49 either returns a reflection that is sensed by the optical sensor 72 or no reflection is returned indicating that the calibration target 49 has been located. A digital response to this signal is used to determine the reflective state of the cell stack 70. Locating the absolute positions of the cartridges in the storage cells in a library requires being able to sense the precise positions of each storage cell in a cell stack and the precise position of the drives for the cartridges. Using a calibration sensor that is mounted on the accessor 18 of the robotics mechanism, the four sides of the calibration target 49 can be determined with precision. The light emitter 74 images a spot of light onto the target fiducial 49 and the optical sensor 72 senses the reflected energy. When over the target 49 which is a hole in the top cell block 32 and the bottom cell block 34, there is no reflected light. The hole to no hole transitions can be precisely determined. Finding the four edges of the target 49 provides the precise location of the center of the target 49.

Knowing the center of both the top and bottom targets 49 in the X direction, see FIG. 13, the mast tilt of the robotics relative to the cell stack 70 can be determined. Knowing the Y center of both the top and bottom targets 49, the Y location of each cell can be computed. All of the blocks comprising the cell stack, top cell block 32, bottom cell block 34 and intermediate cell blocks 36 are the same height since each are molded. The center of each cell in the cell stack 70 can be calculated and used to position the accessor 18 and the gripper 20 and 21 for a pick or place operation.

Referring to FIG. 14, the process for finding each cell stack includes the following steps.

Nominal X and Y locations are used to position the tape library robotics in an area in which the fiducial exists in open space. A two pass vertical sweep is made with the calibration sensor in order to determine the Y center. Once the Y center is determined, the robotic is placed in that vertical center and a two pass horizontal sweep is made to determine the X center. Since it is impossible to stop the robot at the exact transition of the sensor, the two pass scan is performed and an average is taken to provide a more precise location of the fiducial center. The vertical center is calculated as YCenter= (Et(Pass1)+Eb(Pass1)+Eb(Pass2)+Et(Pass2))/4. The horizontal center is calculated as Xcenter=(El(Pass1)+Er (Pass1)+Er(Pass2)+El(Pass2))/4.

Once the top and bottom column fiducial centers are determined, the precise location of each cell can then be determined. First the vertical pitch of each cell can be calculated by:

$Y$pitch=(($Y$TopCenter−Offset of Top Cell to Top Fiducial)−($Y$BotCenter+Offset of Bottom Cell to Bottom Fiducial))/Number of Cells The relative mast tilt of the robot is determined by Mast Tilt=(Cell Number $X$*$Y$Pitch*$X$($X$BottomCenter−$X$TopCenter))/($Y$TopCenter−$Y$BottomCenter))

The relative mast tilt of the robot is then applied to the calculation of the X position of the cell by the following:

$X$CellCenter=$X$TopCenter+Mast Tilt

Figure 16:
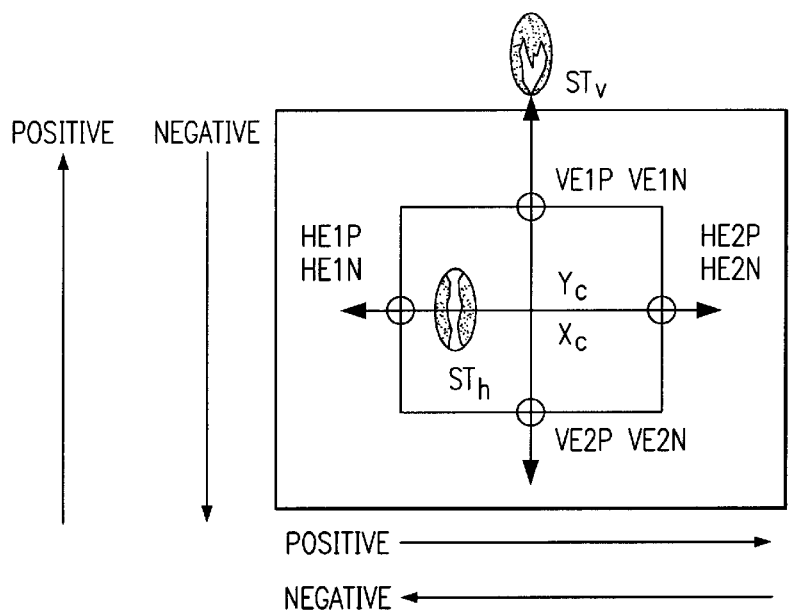
FIG. 16 shows the scan procedure for the column fiducials of FIG. 15.

The Y position of the cell is calculated by the following:

$Y\text{CellCenter}=(Y\text{TopCenter}-Y\text{Offset of Top Cell to Top Fiducial})-((\text{Cell Number}-1)*Y\text{Pitch})+Y\text{Offset of picker palm to sensor}$ The fiducial target 49 at the top and bottoms of each storage column cell stack 70 are meant to be just black holes in space that can be found by using a nominal location of this hole. They are positioned on both the top and bottom of each storage column, drive, and I/O station. The process for storage columns, drives, and I/O stations are nearly the same except that drives only contain one fiducial. The fiducial located on the storage columns will be discussed here. They are shown in FIGS. 12, 13, 14, 15, and 16. Once the top and bottom fiducial centers are located, then any absolute location of the storage cells can be resolved. A hunting process is also used in order to allow a large tolerance off the initial or nominal locations. This concept eliminates a strict manufacturing build spec. This hunting process allows, for example, + or −9 mm off the nominal fiducial location. The fiducial center find process is as follows:

Position robot calibration sensor to top column fiducial position Stv from FIG. 16. This is 14 mm above the nominal Y location of the fiducial. This allows for a wider Y window in the top column fiducial. The robot does a continuous motion downward until the calibration sensor switches to the on state. This is the indication that the optical spot is now positioned on the fiducial reflective space. The robot starts a negative sweep downward while monitoring the calibration sensor. This process monitors the state change of the sensor from on to off and back to the on state. This registers the state change of the fiducial hole edges as VE1N (off) and VE2N (on). These two edges found in the negative sweep are then compared to a window of 2 to 8 mm. This guarantees that this is the fiducial hole vertically. If the edges are determined not to be within the fiducial limits or a VExN edge is not found, then the robot is once again positioned to STv with a +3 mm offset in the X position and the scan process is repeated. This process is called hunting for the fiducial hole in the negative Y direction and is then −3 mm in the X direction continued with increments of +3 mm in the X direction. If VE1N and VE2N are found to within the fiducial hole limits, then a positive scan is made upward with the robot monitoring for fiducial edges VE2P and VE1P. No hunting is performed in the Y positive direction since it is assumed that we are within the fiducial hole. Now an average of the locations of these four edges can be performed to determine the Y center (Yc) of the fiducial hole.

Once the Y center (Yc) is found, then the robot is positioned to position STh from FIG. 16. The X location of STh is derived as being the nominal X position+11 mm. This should start the scanning of the robot from within the fiducial hole. The robot then creeps in the negative direction until the calibration sensor indicates the on state. This state now puts the robot sensor on the reflective space of the fiducial. The robot starts a positive sweep across the fiducial while monitoring the calibration sensor. This process monitors the state change of the sensor from on to off and back to the on state. This registers the state change of the fiducial hole edges as HE1P (off) and HE2P (on). These two edges found in the positive sweep are then compared to be with a window of 6 to 15 mm. This guarantees that this is the fiducial hole horizontally. If HE1P and HE2P are found to be within the fiducial hole limits, then a negative scan is made across the fiducial with the robot monitoring for fiducial edges HE2N and HE1N. Now an average of the locations of these four edges can be performed to determine the X center (Xc) of the fiducial hole.

The vertical center of the column fiducial is calculated as the following:

$Yc=(YE1P+YE2P+YE1N+YE2N)/4$

The horizontal center of the column fiducial is calculated as the following:

$Xc=(HE1P+HE2P+HE1N+HE2N)/4$

This process is repeated for the bottom column calibration target 49. In order to get a more precise location of the STv position of the bottom fiducial, the delta of the nominal top fiducial is used to obtain a more precise starting location. These then eliminate unnecessary hunting in the Y direction. The Yc and Xc (Y Center and X Center) for both the top and bottom column fiducials are saved for future cell locations as the following in FIG. 15. XTnYTn and XBnYBn is found by the calibration sensor, whereas X is the X center location, Y is the Y center location, T is the top column fiducial, B is the bottom column fiducial and n is the column number or cell number. Since environment changes tend to change the height of columns, this process allows the dynamic calculation of the Y pitch of the storage cell locations based upon the top and bottom fiducial location data. Y pitch as shown in FIG. 12 is calculated as the following:

$Y\text{Pitch}=((YTn-YT\text{Offset})-(Ybn+YB\text{Offset}))/\text{NumCells},$ whereas Ytn is the stored Y location of the top column n fiducial, Ybn is the stored Y locations of the bottom column n fiducial, YTOffset is the Y offset from the top column fiducial to the first storage cell, YBOffset is the Y offset from the bottom column fiducial to the last storage cell, and NumCells is the number of storage cells within the storage column.

Since manufacturing build tolerances vary from one machine to another, the X location of the top storage cell may be different than that of the bottom storage cell. This may be the result of the different placements of the storage array within the frame side. Also the vertical mast 18 of the picker assembly may lean or tilt as shown in FIG. 13 and this may cause the X location of the top column fiducial to be different from that of the bottom column fiducial. In both cases, this mast tilt can be calculated based upon the top and bottom fiducial location data as the following:

$\text{MastTilt}=(\text{NumCells}*Y\text{Pitch}*(XBn-XTn))/(YTn-YBn)$ whereas NumCells is the number of storage cells within the storage column, Ypitch is the calculated pitch of the storage cells as determined above, Xbn is the bottom column fiducial X location, Xtn is the top column fiducial X location, Ytn is the top column fiducial Y location, and Ybn is the bottom column fiducial Y location.

Once knowing the top and bottom X Y locations, mast tilt of the gripper assembly and frame array, and the Ypitch of the storage cells, an absolute storage cell location can be derived from the following:

$Y\text{Coord}=(YTn-YS)-(\text{Cell}\#*Y\text{Pitch})-Y\text{hand}$ whereas Ytn is the top column fiducial location, YS is the Y offset from the top column fiducial to the first storage cell, Cell# is the cell number with the storage column in which the absolute location is to be derived, Ypitch is the Y pitch of the storage cells with the storage column, and the Yhand is the offset from the center of the gripper mechanism to the calibration sensor as shown in FIG. 12.

$X\text{coord} = XTn + \text{MastTilt} + X\text{hand}$ whereas XTN is the top column fiducial location and MastTilt is derived as described above.

Figure 17:
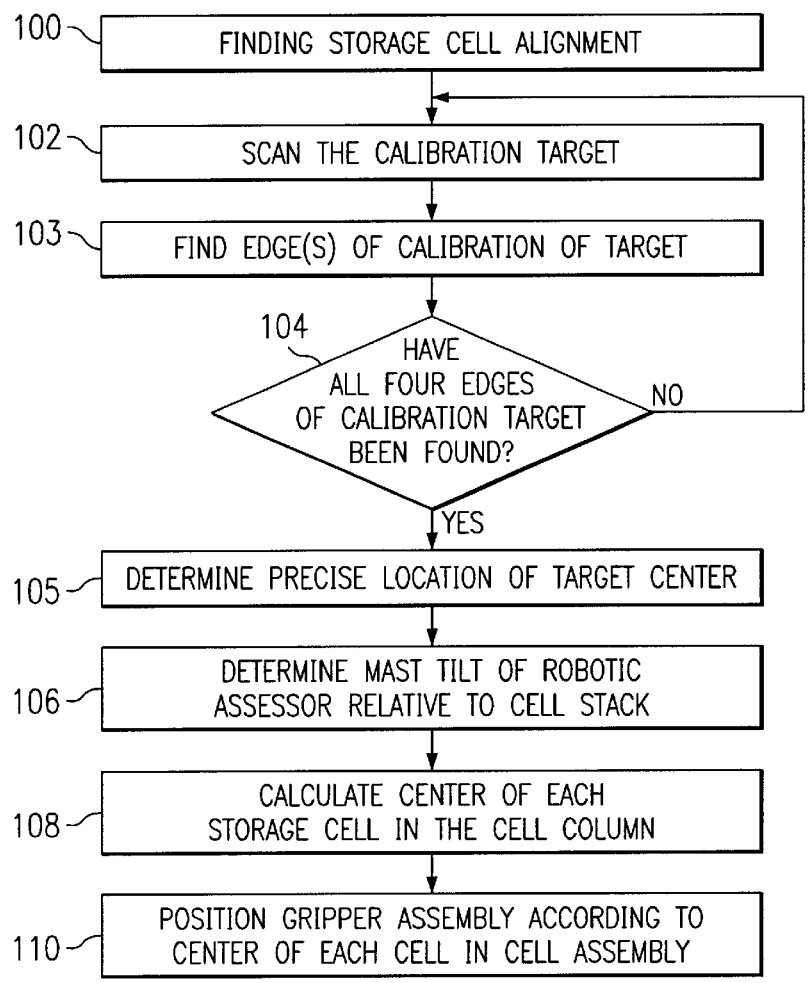
FIG. 17 is a flowchart of the process steps to precisely position the gripper assembly to each storage cell.

The process for precisely positioning the gripper assembly relative to each cell in the cell assembly, therefore, is shown in FIG. 17. The process for finding the storage cell alignment, as discussed above for FIGS. 12 to 16, block 100, starts with the scanning of the calibration target, as shown in block 102 to find the four edges of the calibration target as shown in block 103. The steps in blocks 102 and 103 are repeated until all four edges of the calibration target have been found, as shown in block 104. Once all four edges have been found, the next step is to determine the precise location of the target center, as shown in block 105. The next step in block 106 determines the mast tilt of the robotic accessor relative to the cell stack. In block 108, the center of each storage cell in the cell column is calculated. Then, with the advantages of the calibration targets, as shown in block 110, the gripper assembly can be accurately positioned according to the center of each cell in the cell assembly.

While the invention has been particularly shown and described with reference to preferred embodiments thereof, it will be understood by those skilled in the art that various changes in form and detail maybe made therein without departing from the spirit and scope of the invention. For instance, the back plate may be made of steel for a rigid construction and the shaped openings in the back plate 22 can be formed by a numerical controlled process control computer which will provide accurate positioning of the "T" shaped openings 30 and 31 relative to each other and relative to the openings which hold the shelf 28 and the spring 38. The cell blocks, likewise, can be made of plastic or any strong material to hold the shape for storing the cartridges within. The appended claims are the only limitation on the described invention.

We claim:

1. In a mass data storage and retrieval system for cartridges containing information storing media including:

at least one storage cell module array, each including a back plate mounting means having at least one column of cell blocks forming a plurality of cell cavities mounted thereon, each block shaped to hold a cartridge stored therein;

a plurality of data recorder modules for receiving and reading information from and writing information to the media of the cartridges for information storage;

an accessor including a picker mechanism and associated with the storage module for retrieving cartridges from its storage cell cavity and for transporting cartridges between its storage cell and one of the plurality of data recorders for use by one of the data recorder modules during a reading and/or writing operation and for returning the cartridge to its storage cell cavity after the operation; and a gripper means mounted on said picker mechanism of said accessor for grasping the cartridge to retrieve the cartridge from its storage cell cavity, for holding the cartridge during its transport to the data recording module and for retrieving the cartridge from the data recording module after the operation for transport back to the storage cell;

the improvement wherein each back plate mounting means includes continuous label stripes, one stripe fastened to the back plate mounting means behind and along the entire length of each column of cell blocks and containing code markings along its width and along its length such that the code marking is viewable through each cartridge storage cell for indicating an empty storage cell cavity, and also including scanning means mounted to the accessor to scan and read the code marking if the storage cell does not contain a cartridge.

2. The system and improvement as in claim 1 wherein the code marking is a bar-code and the scanning means is adapted to read bar-codes and transmit the bar-code information to the library system.

3. A mass data storage and retrieval system comprising:

a plurality of cartridges for storing data information located on media within each of said plurality of cartridges;

a data directory for generating, in response to a request from the host central processing unit, a cartridge location output signal identifying the cartridge location within the mass storage library;

a plurality of data recorder modules for receiving and reading information from and writing information to the tape media of the selected cartridge for information storage;

at least one storage cell module array each including a back plate mounting means having at least one column of cell blocks forming a plurality of cell cavities mounted thereon, each block shaped to hold a cartridge stored therein;

an accessor including a picker mechanism and associated with the storage module for retrieving one of the tape cartridges from its storage cell cavity and for transporting cartridges between its storage module and one of the plurality of data recorders for use by one of the data recorder modules during a reading and/or writing operation and for returning the cartridge to its storage cell cavity after the operation; and a gripper means mounted on said picker mechanism of said accessor for grasping the cartridge to retrieve the cartridge from its storage cell cavity, for holding the cartridge during its transport to the data recording module and for retrieving the cartridge from the data recording module after the operation for transport back to the storage cell of its storage module;

continuous label stripes having one stripe fastened to the each column of cell blocks and containing a code marking along its width and along its length such that the code marking is viewable through each cartridge storage cell for indicating an empty storage cell cavity, and also including scanning means mounted to the accessor to scan and read the individual code marking if the storage cell code does not contain a cartridge and to report the empty storage cell cavity information to the data directory.

4. The system as in claim 3 wherein the code marking is a bar-code and the scanning means is adapted to read bar-codes and transmit the bar-code information to the data directory.

5. A storage cell module array for a data mass storage library having cartridges containing information storing media, said storage cell module array comprising:

a back plate mounting means having at least one column of cell blocks forming a plurality of cell cavities, each cavity shaped to hold a cartridge stored therein; and continuous label stripes having one stripe fastened to the back plate mounting means behind and along the entire length of each column of cell blocks, each label stripe containing a code marking along its width and along its length such that the code marking is viewable through each cartridge storage cell for indicating an empty storage cell cavity.

6. The system as in claim 5 wherein the code marking is a bar-code.

7. A modularized library storage cell array for removable cartridges containing data storage media comprising:
   a back plate mounting means;
   at least one column of blocks fastened to said back plate mounting means with each column forming a plurality of cell cavities for retaining the cartridges; and
   continuous label stripes having one stripe fastened to the back plate mounting means behind and along the entire length of each column of cell blocks, each label stripe containing a code marking along its width and along its length such that the code marking is viewable through each cartridge storage cell for indicating an empty storage cell cavity.

8. The system as in claim 7 wherein the code marking is a bar-code.

* * * * *